US009779570B2

(12) United States Patent
Lee et al.

(10) Patent No.: US 9,779,570 B2
(45) Date of Patent: Oct. 3, 2017

(54) SYSTEM AND METHOD OF USER CODE SYNCHRONIZATION WITH Z-WAVE DOOR LOCKS

(75) Inventors: Albert Lee, Brooklyn, NY (US); Hong-Jyh Chen, Woodbury, NY (US); Lincoln Widgoff Kliman, Smithtown, NY (US); Jaime E. Barahona, Hempstead, NY (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 452 days.

(21) Appl. No.: 13/459,889

(22) Filed: Apr. 30, 2012

(65) Prior Publication Data

US 2013/0285791 A1 Oct. 31, 2013

(51) Int. Cl.

*H04L 7/00* (2006.01)
*G06F 7/04* (2006.01)
*G07C 9/00* (2006.01)

(52) U.S. Cl.

CPC ..... *G07C 9/00817* (2013.01); *G07C 9/00309* (2013.01); *G07C 9/00571* (2013.01); *G07C 2009/00793* (2013.01); *G07C 2009/00825* (2013.01); *G07C 2209/06* (2013.01)

(58) Field of Classification Search

CPC ............ G07C 9/00817; G07C 9/00309; G07C 9/00571; G07C 2209/06; G07C 2009/00793; G07C 2009/00825
USPC .......................................... 340/5.7, 5.72, 4.2
See application file for complete search history.

(56) References Cited

U.S. PATENT DOCUMENTS

| | | | | |
|---|---|---|---|---|
| 5,748,100 | A * | 5/1998 | Gutman et al. | 340/7.22 |
| 2002/0099945 | A1 * | 7/2002 | McLintock et al. | 713/186 |
| 2003/0158760 | A1 * | 8/2003 | Kannenberg | G06F 8/70 705/4 |
| 2005/0165806 | A1 * | 7/2005 | Roatis | G06F 21/6209 |
| 2008/0313182 | A1 * | 12/2008 | Vasa | G06F 3/023 |
| 2013/0008213 | A1 * | 1/2013 | Brown et al. | 70/264 |

* cited by examiner

*Primary Examiner* — Yong Hang Jiang
(74) *Attorney, Agent, or Firm* — Husch Blackwell LLP

(57) ABSTRACT

Systems and methods of user code synchronization with Z-wave door locks are provided. Methods can include determining an occurrence of a predetermined event, upon the occurrence of the predetermined event, identifying a set of a plurality of user codes stored in a control panel to be synchronized, and wirelessly transmitting the set of the plurality of user codes to be synchronized from the control panel to at least one door lock using a Z-wave communications protocol.

13 Claims, 2 Drawing Sheets

SYSTEM AND METHOD OF USER CODE SYNCHRONIZATION WITH Z-WAVE DOOR LOCKS

FIELD

The present invention relates generally to security systems. More particularly, the present invention relates to systems and methods of user code synchronization with z-wave door locks.

BACKGROUND

Integrated security systems known in the art can include a security system control panel and a plurality of Z-wave automation devices, for example, door locks. However, the door locks in the security system must be synchronized with user access codes so that the door locks allow and/or disallow access to the appropriate persons.

For example, in known systems, a user must manually program each door lock in the security system by entering the user codes that are stored in the security system control panel. Each door lock can originate from a different manufacturer and, thus, have different programming instructions. This can be a time consuming, tedious, and cumbersome task that is prone to errors.

Accordingly, there is a continuing, ongoing need for improved systems and methods of user code synchronization.

DETAILED DESCRIPTION

Figure 1:
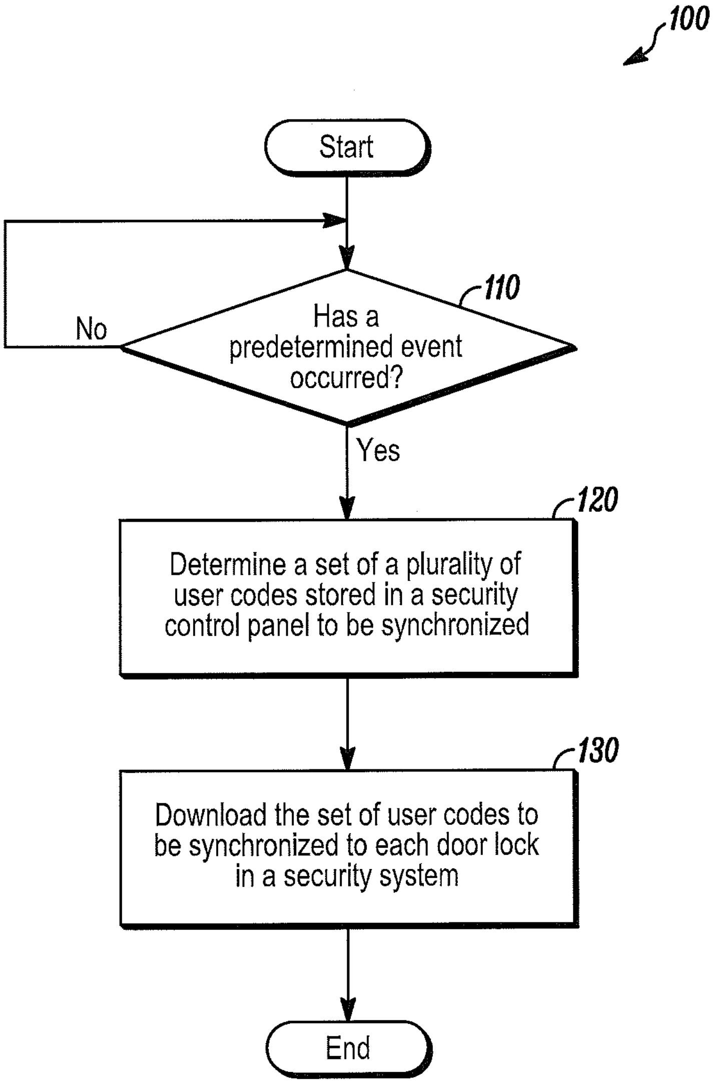
FIG. 1 is a flow diagram of a method in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein include systems and methods of user code synchronization with Z-wave door locks. For example, a security system control panel can store a plurality of user access codes, and systems and methods disclosed herein can automatically synchronize the control panel with door locks in the security system, thus eliminating the need for manual synchronization and user code programming at each door lock. In accordance with disclosed embodiments, the security system control panel can synchronize with the door locks regardless of the door lock manufacturer.

In some embodiments disclosed herein, synchronization can occur upon the occurrence of a predetermined event. For example, the predetermined event can include a user code being added to or deleted from the control panel, the control panel exiting out of a programming mode, and/or the control panel or a door lock powering up.

In accordance with disclosed embodiments, synchronization can include the security system control panel automatically downloading the user codes stored therein to each of the door locks in the security system. For example, upon an occurrence of the predetermined event, the control panel can download a plurality of user codes stored therein to each of the door locks in the security system. In some embodiments, the control panel can download the whole plurality of user codes stored therein. In other embodiments, the control panel can download a sub-set of the plurality of user codes stored therein.

Systems and methods disclosed herein can employ a Z-wave communications protocol and Z-wave protocol commands defined for the class of door locks in the security system. For example, the control panel can include a Z-wave controller that communicates with a respective Z-wave controller in each of the door locks.

In some embodiments disclosed herein, the plurality of user codes stored in the control panel can be updated by a user. For example, a user access code can be added to or deleted from the control panel locally or remotely.

FIG. 1 is a flow diagram of a method 100 in accordance with disclosed embodiments. As seen in FIG. 1, the method 100 can include determining if and when a predetermined event has occurred as in 110. For example, the predetermined event can include a user code being added to or deleted from a control panel, the control panel exiting a programming mode, and/or the control panel or a door lock powering up. However, the predetermined event is not so limited and could be any predetermined event as would be desired by one of ordinary skill in the art.

If the method 100 determines that a predetermined event has not occurred as in 110, then the method can continue determining if and when a predetermined event has occurred as in 110. However, if the method 100 determines that a predetermined event has occurred as in 110, then the method 100 can determine which set of a plurality of user codes stored in a control panel should be synchronized as in 120. That is, the method 100 can identify the set of user codes to be synchronized. For example, the set to be synchronized can include the whole plurality of user codes stored in the control panel. Alternatively, the set to be synchronized can include a sub-set of the plurality of user codes stored in the control panel.

Then, the method 100 can download the set of user codes to be synchronized to each door lock in a security system as in 130. For example, the method 100 can transmit the set of user codes to be synchronized to each door lock in the security system using a Z-wave communications protocol. In some embodiments, the method 100 can download the set of user codes to be synchronized to a door lock in the security system regardless of the manufacture of the door lock. That is, the security system control panel and the door lock need not have the same manufacturer.

Figure 2:
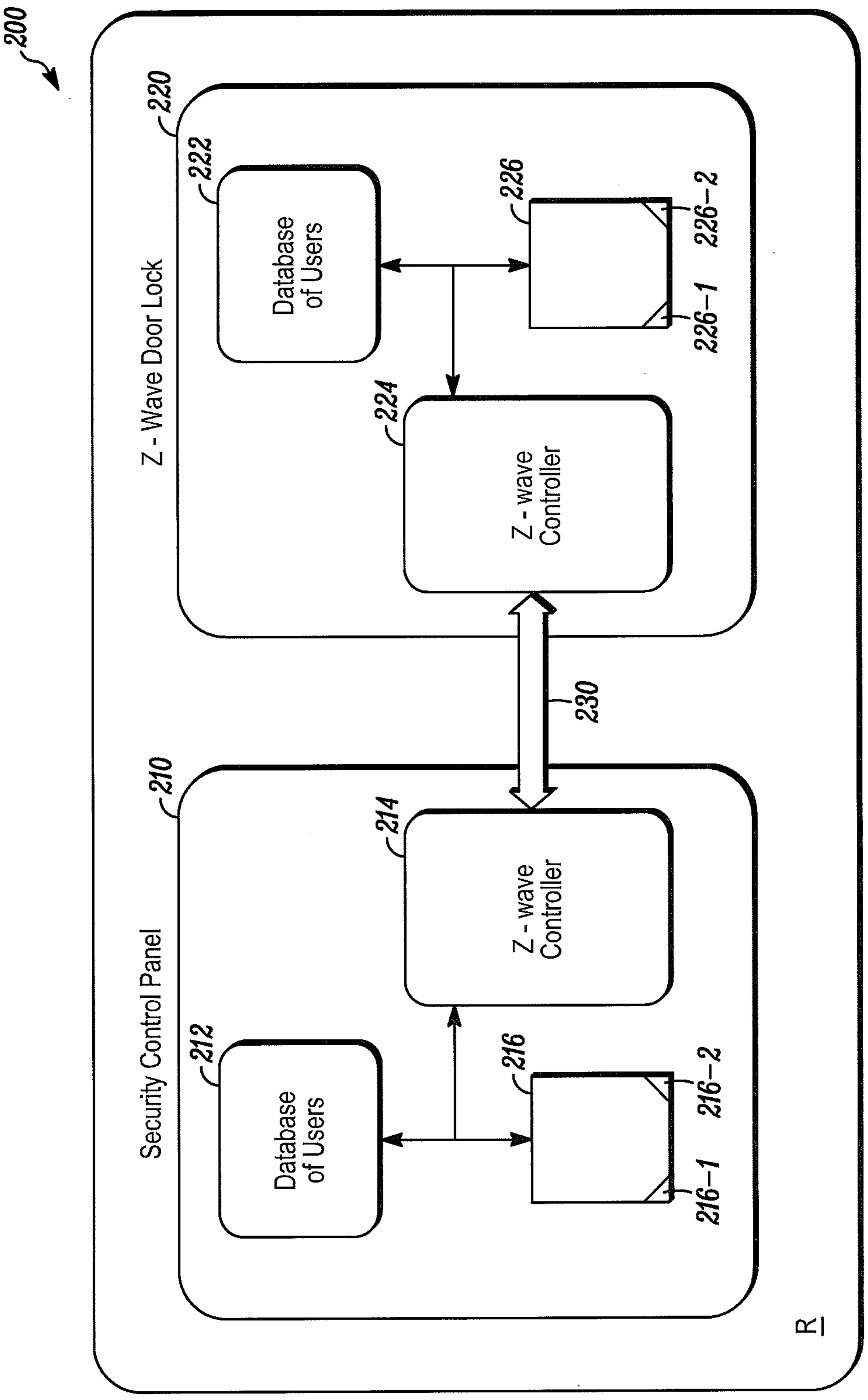
FIG. 2 is a block diagram of a system for carrying out the method of FIG. 1 and others in accordance with disclosed embodiments.

The method 100 of FIG. 1 and others in accordance with disclosed embodiments can be carried out by the system 200 shown in FIG. 2. As seen in FIG. 2, the system 200 can include a security system installed in a region R. The system 200 can include a security system control panel 210 and at least one Z-wave door lock 220.

Although only one Z-wave door lock 220 is shown in FIG. 2, it is to be understood that the system 200 can include any number of Z-wave door locks 220 as would be desired by one of ordinary skill in the art. For example, the system 200 can include a plurality of Z-wave door locks 220 installed throughout the region R.

The security system control panel 210 can include a database device 212, a Z-wave controller 214, control circuitry 216, one or more programmable processors 216-1, and executable control software 216-2. Similarly, the Z-wave door lock 220 can include a database device 222, a Z-wave controller 224, control circuitry 226, one or more programmable processors 226-1, and executable control software 226-2.

Each of the executable control software 216-2 in the control panel 210 and the executable control software 226-2 in the door lock 220 can be stored on a respective transitory or non-transitory computer readable medium, including, but not limited to computer memory, RAM, optical storage media, magnetic storage media, flash memory, and the like. In some embodiments, the control software 216-2 in the control panel 220 can execute the method 100 of FIG. 1 and others disclosed herein. For example, the control software 216-2 can determine if and when a predetermined event has occurred, can identify a set of user codes stored in the database 212 to be synchronized, and can instruct the Z-wave controller 214 to transmit the set of user codes to be synchronized to the door lock 220.

The Z-wave controller 214 in the control panel 210 can communicate with the Z-wave controller 224 in the door lock 220 using a Z-wave communications protocol. For example, the Z-wave controller 214 in the control panel 210 can wirelessly transmit a signal 230, for example, a radio frequency (RF) signal, to the Z-wave controller 224 in the door lock 220. In some embodiments, the signal 230 can be transmitted in a sub-gigahertz frequency range, for example, substantially in the range of 900 MHz.

The signal 230 transmitted from the Z-wave controller 214 in the control panel 210 to the Z-wave controller 224 in the door lock 220 can include information from the database device 212 in the control panel 210. For example, the database device 212 in the control panel 210 can include a plurality of user access codes. Accordingly, the signal 230 can include some or all of the plurality of user access codes stored in the database device 212. The Z-wave controller 214 in the control panel 210 can transmit the user codes stored in the database device 212 of the control panel 210 to the door lock 220 via the signal 230.

The Z-wave controller 224 of the door lock 220 can receive the user codes from the control panel 210 and store the received user codes in the database device 222 of the door lock 220. As seen in FIG. 2, the communication between the control panel 210 and the door lock 220 can be bidirectional. Thus, in some embodiments, the door lock 220 can wirelessly transmit a signal, for example, a confirmation signal, to the control panel 210 upon receipt of the signal 230. Communication from the door lock 220 to the control panel 210 can also use the Z-wave communications protocol.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:

determining an occurrence of a predetermined event;

upon determining the occurrence of the predetermined event, identifying a set of a plurality of user codes stored in a database of a control panel to be synchronized;

the control panel wirelessly transmitting the set of the plurality of user codes to be synchronized to a door lock using a Z-wave communications protocol; and the control panel wirelessly receiving a confirmation signal from the door lock using the Z-wave communications protocol, wherein the control panel is installed in a region, wherein the door lock is installed in the region, wherein identifying the set of the plurality of user codes stored in the database of the control panel to be synchronized includes identifying all of the plurality of user codes stored in the database of the control panel to be synchronized, wherein the predetermined event comprises locally adding a new user code to the plurality of user codes at the control panel or locally deleting one of the plurality of user codes from the database at the control panel.

2. The method of claim 1 wherein identifying the set of the plurality of user codes stored in the database of the control panel to be synchronized includes identifying a sub-set of the plurality of user codes to be synchronized.

3. The method of claim 1 wherein wirelessly transmitting the set of the plurality of user codes to be synchronized from the control panel to the door lock using the Z-wave communications protocol includes wirelessly transmitting the set of the plurality of user codes to be synchronized from the control panel to a plurality of door locks using the Z-wave communications protocol.

4. The method of claim 1 wherein wirelessly transmitting the set of the plurality of user codes to be synchronized from the control panel to the door lock using the Z-wave communications protocol includes wirelessly transmitting a first signal containing the set of the plurality of user codes to be synchronized from a first Z-wave controller associated with the control panel to a second Z-wave controller associated with the door lock.

5. The method of claim 4 wherein wirelessly transmitting the first signal includes wirelessly transmitting the first signal in a sub-gigahertz frequency range.

6. The method of claim 4 wherein wirelessly transmitting the first signal includes wirelessly transmitting the first signal at a frequency in a range of approximately 900 MHz.

7. A control panel comprising:

a database device;

a first Z-wave controller installed within a region;

a programmable processor installed within the region; and executable control software stored on a non-transitory computer readable medium, wherein the programmable processor and the executable control software determine an occurrence of a predetermined event, wherein, upon determining the occurrence of the predetermined event, the programmable processor and the executable control software identify a set of a plurality of user codes stored in the database device to be synchronized, wherein the first Z-wave controller wirelessly transmits the set of the plurality of user codes to be synchronized to a door lock installed within the region using a Z-wave communications protocol, wherein the programmable processor and the executable control software identifying the set of the plurality of user codes stored in the database device to be synchronized includes the programmable processor and the executable control software identifying all of the plurality of user codes stored in the database device to be synchronized, wherein the predetermined event comprises locally adding a new user code to the plurality of user codes in the database device or locally deleting one of the plurality of user codes from the database device, and wherein the first Z-wave controller receives a confirmation signal from the door lock using the Z-wave communications protocol.

8. The system of claim 7 wherein the programmable processor and the executable control software identifying the set of the plurality of user codes stored in the database device to be synchronized includes the programmable processor and the executable control software identifying a sub-set of the plurality of user codes to be synchronized.

9. The system of claim 7 wherein the first Z-wave controller wirelessly transmitting the set of the plurality of user codes to be synchronized to the door lock using the Z-wave communications protocol includes the first Z-wave controller wirelessly transmitting the set of the plurality of user codes to be synchronized to a plurality of door locks using the Z-wave communications protocol.

10. The system of claim 7 wherein the first Z-wave controller wirelessly transmitting the set of the plurality of user codes to be synchronized to the door lock using the Z-wave communications protocol includes the first Z-wave controller wirelessly transmitting a first signal containing the set of the plurality of user codes to be synchronized to a second Z-wave controller associated with the door lock.

11. The system of claim 10 wherein the first Z-wave controller wirelessly transmitting the first signal includes the first Z-wave controller wirelessly transmitting the signal in a sub-gigahertz frequency range.

12. The system of claim 10 wherein the first Z-wave controller wirelessly transmitting the first signal includes the first Z-wave controller wirelessly transmitting the signal at a frequency in a range of approximately 900 MHz.

13. A system comprising:

a security system control panel installed in a region, wherein the security system control panel includes a first Z-wave controller and a database device storing a plurality of user access codes; and a plurality of door locks installed throughout the region, wherein each of the plurality of door locks including a respective second Z-wave controller, wherein, upon an occurrence of a predetermined event, the first Z-wave controller in the security system control panel wirelessly transmits the plurality of user access codes to the respective second Z-wave controller in each of the plurality of door locks using a Z-wave communications protocol, wherein the predetermined event comprises locally adding a new user code to the plurality of user codes at the security system control panel or locally deleting one of the plurality of user codes from the database device at the security system control panel, and wherein, upon receipt of the plurality of user access codes, the respective second Z-wave controller in each of the plurality of door locks wirelessly transmits a confirmation signal to the first Z-wave controller in the security system control panel using the Z-wave communications protocol.

* * * * *